United States Patent
Williamson, Jr.

(10) Patent No.: US 9,157,297 B2
(45) Date of Patent: Oct. 13, 2015

(54) PUMP-THROUGH FLUID LOSS CONTROL DEVICE

(75) Inventor: Jimmie Robert Williamson, Jr., Carrollton, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 370 days.

(21) Appl. No.: 13/810,437

(22) PCT Filed: Feb. 6, 2012

(86) PCT No.: PCT/US2012/023922
§ 371 (c)(1),
(2), (4) Date: Jan. 15, 2013

(87) PCT Pub. No.: WO2013/119194
PCT Pub. Date: Aug. 15, 2013

(65) Prior Publication Data
US 2013/0264069 A1    Oct. 10, 2013

(51) Int. Cl.
*E21B 34/06* (2006.01)
*E21B 34/08* (2006.01)
*F16K 17/04* (2006.01)
*E21B 43/12* (2006.01)

(52) U.S. Cl.
CPC ............... *E21B 34/06* (2013.01); *E21B 34/08* (2013.01); *E21B 43/128* (2013.01); *F16K 17/048* (2013.01)

(58) Field of Classification Search
CPC ..... E21B 21/10; E21B 21/103; E21B 34/063; E21B 34/08; E21B 43/128; F16K 15/021; F16K 17/02; F16K 17/04; F16K 17/048; F16K 17/196
USPC .................. 166/320, 321, 325, 374; 137/155, 137/512.2, 512.3, 512.5, 513
See application file for complete search history.

(56) References Cited

U.S. PATENT DOCUMENTS

| | | | | |
|---|---|---|---|---|
| 4,962,819 A | * | 10/1990 | Bailey et al. | 175/218 |
| 5,282,492 A | * | 2/1994 | Angeli | 137/493.4 |
| 6,289,990 B1 | * | 9/2001 | Dillon et al. | 166/319 |
| 2003/0209350 A1 | * | 11/2003 | Laurel | 166/373 |
| 2009/0294177 A1 | * | 12/2009 | Chan et al. | 175/57 |
| 2010/0006570 A1 | * | 1/2010 | Borras Llompart | 220/89.1 |
| 2010/0032162 A1 | * | 2/2010 | Olstad et al. | 166/305.1 |
| 2010/0116503 A1 | * | 5/2010 | Leeb | 166/325 |
| 2010/0126721 A1 | * | 5/2010 | Al-Jarri et al. | 166/275 |
| 2010/0282476 A1 | * | 11/2010 | Tessier et al. | 166/373 |

OTHER PUBLICATIONS

PES Pump-Through Fluid Loss Control Device. Halliburton Communications (p. 1-4). www.halliburton.com.

* cited by examiner

*Primary Examiner* — Robert E Fuller
*Assistant Examiner* — Christopher Sebesta (57) ABSTRACT

Presented are apparatus and methods for pump-through fluid loss control. In one embodiment, the fluid loss control device is positioned in a wellbore having a first and a second one-way valve therein. The first one-way valve is openable in response to a first, selected differential pressure acting upward across the first one-way valve. For example, fluid pumped from an ESP from below the device acts to open the first one-way valve. Fluid is flowed upward through the device through the first one-way valve while the second one-way valve is closed. The first one-way valve is closed by reducing the first differential pressure across the first one-way valve, for example, by turning off the ESP. The second one-way valve is opened in response to a second, selected differential pressure acting downward across the valve. Fluid is flowed downward through the second one-way valve while the first one-way valve is closed.

19 Claims, 7 Drawing Sheets

PUMP-THROUGH FLUID LOSS CONTROL DEVICE

CROSS-REFERENCE TO RELATED APPLICATIONS

None.

FIELD OF INVENTION

The invention relates generally to pump-through fluid loss control devices and, more specifically, to a pump-through fluid loss control device having two one-way valves for controlling fluid flow.

BACKGROUND OF INVENTION

Electrical submersible pumps (ESP) are used in the oil and gas production industry to pump production and other fluids upwards in the wellbore in deep water applications. Some large ESPs are generally capable of pumping from 10-40 k barrels per day depending on conditions and pump specifications. Typically, positioned above the ESP, or other submersible pump, is a standing valve which prevents back-flow (downhole) into the ESP when the pump is shut-off for maintenance, injection procedures, pressure tests, bleeding off produced gas, etc. The standing valve is closed by hydrostatic head when the pump is off, provided, for example, by production fluid in the tubing. For deep water applications, the standing valve can hold a substantial differential pressure across the valve to support hydrostatic head above the ESP and, when applicable, tubing pressure from operations above the ESP. The valve opens when the pump is turned on and produces a relatively low differential pressure drop across the valve to a designed pressure value. The valve remains open for production of hydrocarbons or pumping of fluids uphole.

An ESP may see hundreds of shut-offs each year, again depending on circumstances. It is important to prevent back-flow into most pumps, since such reverse flow tends to rotate the pump backwards, damaging the pump. The standing valve must be able to seal adequately against significant hydrostatic pressure, especially in deep water wells. For example, the standing valve may have to seal against about 8,000 feet of production fluid or hold 3500 psi differential pressure. The standing valve also must withstand the tubing pressure above the valve during uphole operations.

However, it is often desirable for the standing valve to allow leakage of fluid down into the pump to lubricate and prime the pump for when it is activated. Consequently, prior art tubing standing valves, are designed to open to downward fluid flow at a selected differential pressure. For example, the valve may open to a downward fluid differential pressure of 3600-4000 psi. Typically, the pressure differential sufficient to operate the standing valve to fluid flow downward is relatively higher than the differential pressure to open the valve to upward fluid flow.

These requirements, holding against a high pressure (hydrostatic and tubing), opening at a relatively low differential upward pressure for production, and opening at a relatively high pump-down pressure for leakage, make a workable design and manufacture more difficult. For example, relatively hard materials, such as tungsten carbide, and relatively exacting tolerances, for example, at the valve seat, may be required for the valve parts to adequately seal, provide a closely defined small cross-sectional differential area for opening, etc.

Commercially available pump-through fluid loss control devices are made by Halliburton Energy Services, Inc., and sold as PES® Pump-Through Fluid Loss Control Devices. A single valve is used for both production and pump-through, with biasing spring assemblies providing for a relatively lower differential pressure to open the valve for production and a relatively higher differential pressure (pump-down pressure) to open the valve for pump-through procedures. A movable valve element seals on a movable valve seat. Pressure from the ESP below acts on the lower side of the valve element, on a cross-sectional area radially inside the seat, to move the valve upward and allow production. The valve element is biased closed when insufficient pressure is provided from below. For pump-through of fluids downward, fluid pressure is built up in the tubing string above the valve, the differential pressure acting on a narrow annular cross-sectional area of the movable seat. The seat, which is at the upper end or as a shoulder of a slidable sleeve, for example, is biased upward by a biasing mechanism. Sufficient differential pressure moves the seat downward while the valve element is prevented from similar downward movement, thereby opening the valve assembly for downward fluid flow.

The invention disclosed herein is described largely in terms of a standing valve assembly for use above an ESP, for example, in deep water wells. However, such a standing valve assembly can be employed in combination with various tool and string configurations for various purposes, as those of skill in the art will recognize. For example, the tool assembly can be used to prevent the loss of completion fluids or kill fluids and to prevent contamination of the wellbore-perforated interval.

SUMMARY OF THE INVENTION

Presented are apparatus and methods for pump-through fluid loss control. In one embodiment, the fluid loss control device is positioned in a wellbore having a first and a second one-way valve therein. The first one-way valve is openable in response to a first, selected differential pressure acting upward across the first one-way valve. For example, fluid pumped from an ESP from below the device acts to open the first one-way valve. Fluid is flowed upward through the device through the first one-way valve while the second one-way valve is closed. The first one-way valve is closed by reducing the first differential pressure across the first one-way valve, for example, by turning off the ESP. The second one-way valve is opened in response to a second, selected differential pressure acting downward across the valve. Fluid is flowed downward through the second one-way valve while the first one-way valve is closed.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

It should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure. Where this is not the case and a term is being used to indicate a required orientation, the Specification will state or make such clear. "Uphole," "downhole" are used to indicate location or direction in relation to the surface, where uphole indicates relative position or movement towards the surface along the wellbore and downhole indicates relative position or movement further away from the surface along the wellbore, regardless of the wellbore orientation (unless otherwise made clear).

DETAILED DESCRIPTION OF PREFERRED EMBODIMENTS

While the making and using of various embodiments of the present invention are discussed in detail below, a practitioner of the art will appreciate that the present invention provides applicable inventive concepts which can be embodied in a variety of specific contexts. The specific embodiments discussed herein are illustrative of specific ways to make and use the invention and do not limit the scope of the present invention.

The valve device 22 is alternately referred to as a standing valve assembly, pump-through fluid loss control device, or sometimes poppet valve assembly. These alternate terms alternately refer to preferred functions and forms of the valve assembly but are not intended to be limiting, merely descriptive.

Figure 1:
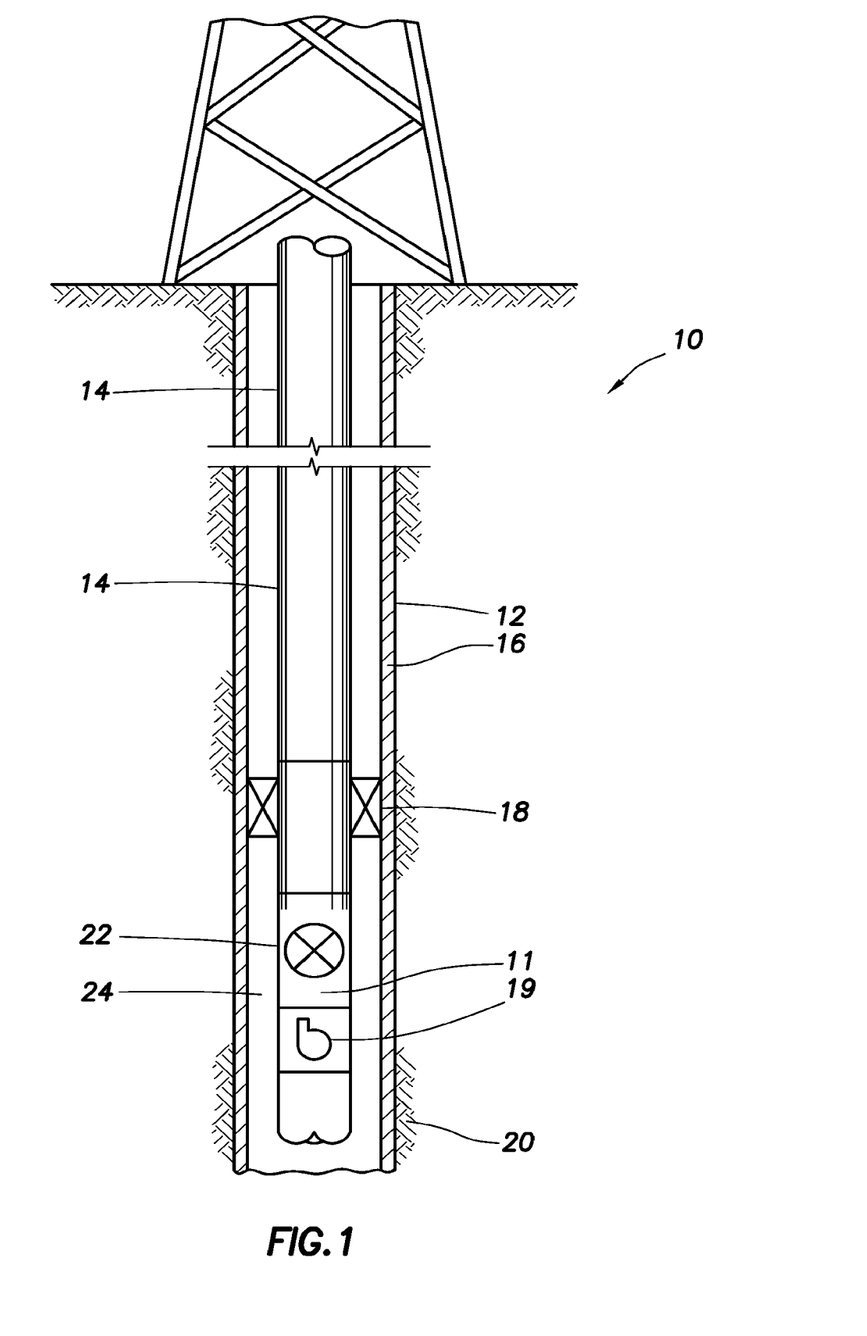
FIG. 1 is a schematic illustration of a well system including a pump-through fluid loss control device according to an embodiment of the invention.

FIG. 1 is a schematic illustration of a well system, indicated generally 10, including a standing valve assembly or pump-through fluid loss control device 22 embodying principles of the present invention. A wellbore 12 extends through various earth strata, including a production zone 20. Wellbore 12 has installed therein casing 16 and a tool string 14, here, a production string. A packer assembly 18 is shown positioned above the standing valve assembly 22, sealing the annulus 24 formed between the production string 14 and wellbore casing 16 and isolating the production interval. A downhole submersible pump, such as ESP 19, is positioned downhole from the standing valve assembly 22 for pumping production fluid from the formation to the surface.

While shown here in a cased, vertical wellbore, and used as a standing valve, the invention will work in any orientation, and in open or cased hole. It is understood that the invention can be used in various methods, including production, workover, completion, testing, drilling, fracturing, remedial procedures, etc. It is also understood that the string shown is exemplary only and that the invention may be used in conjunction with various other tools and in other configurations, such as cross-over tools, injection tools, junk baskets, retrievable or permanent packers, wireline locks, etc.

Figure 2A:
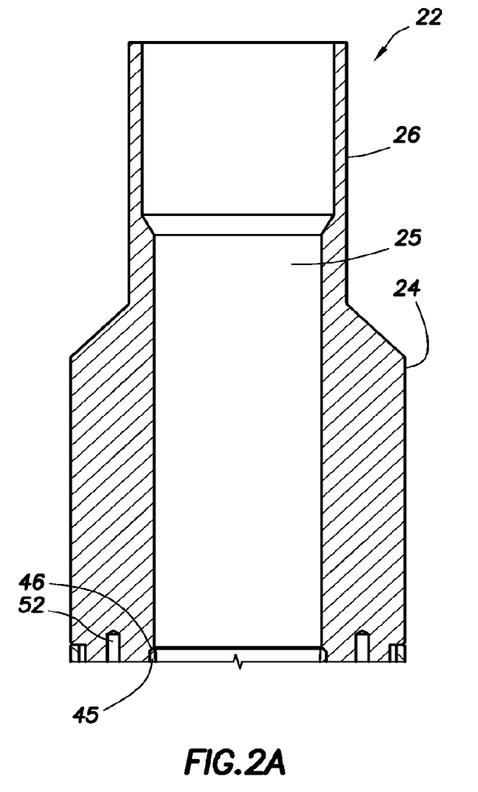
FIGS. 2A-C are cross-sectional views of an exemplary embodiment of the invention with the primary valve open.
Figure 2B:
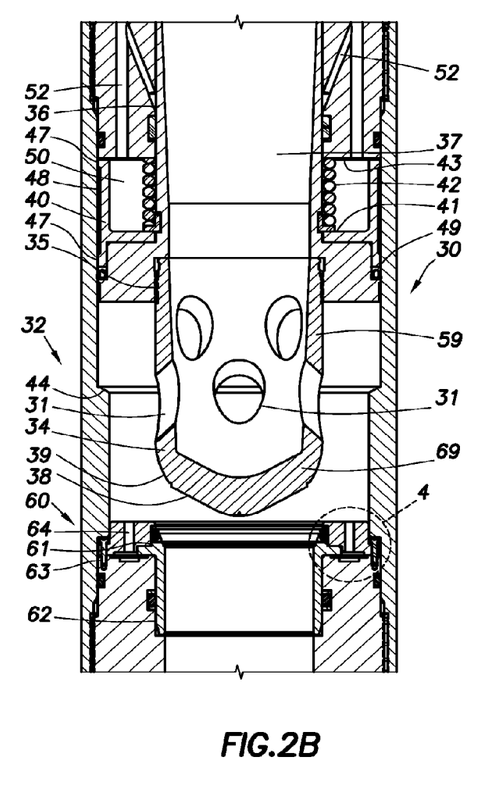
Figure 2C:
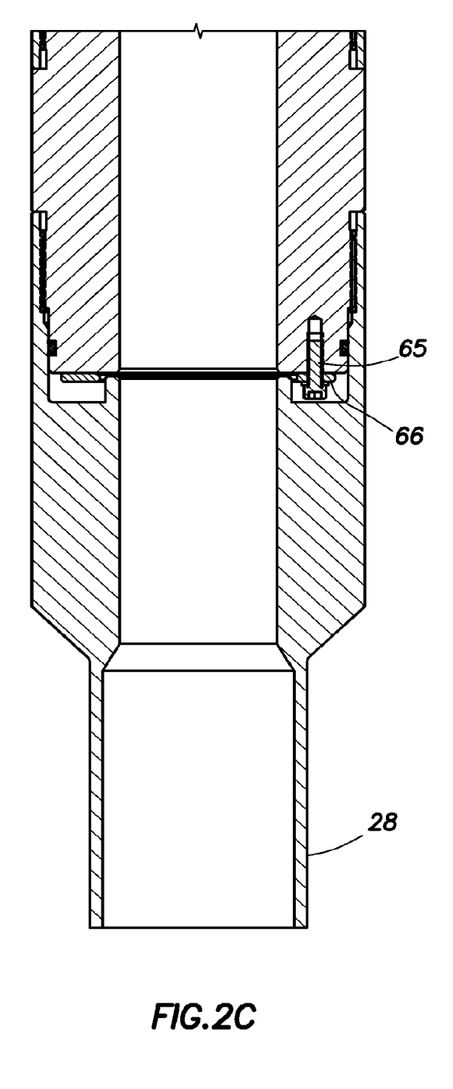
Figure 3A:
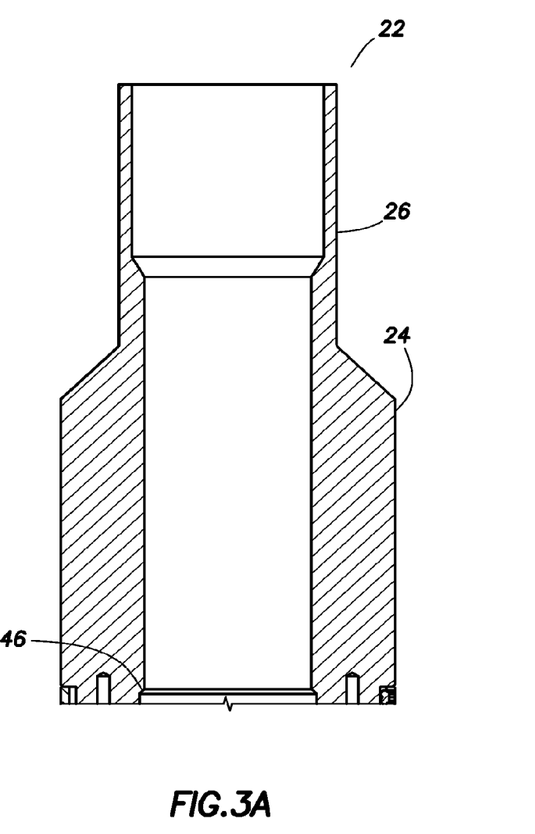
FIGS. 3A-C are cross-sectional views of an exemplary embodiment of the invention with the primary valve closed.
Figure 3B:
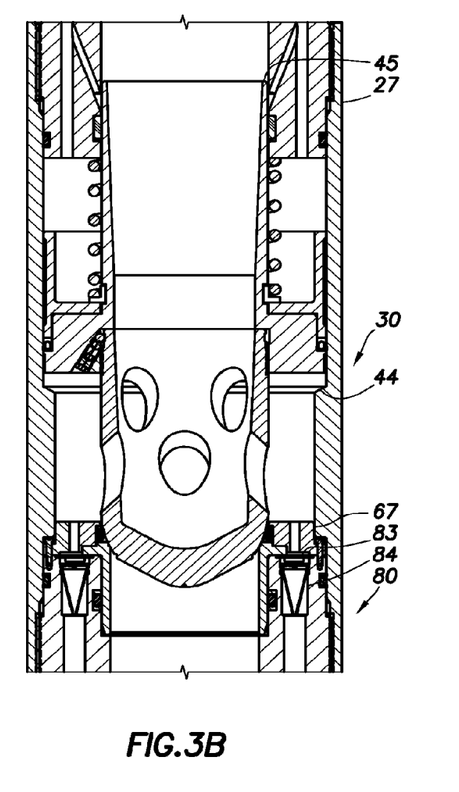
Figure 3C:
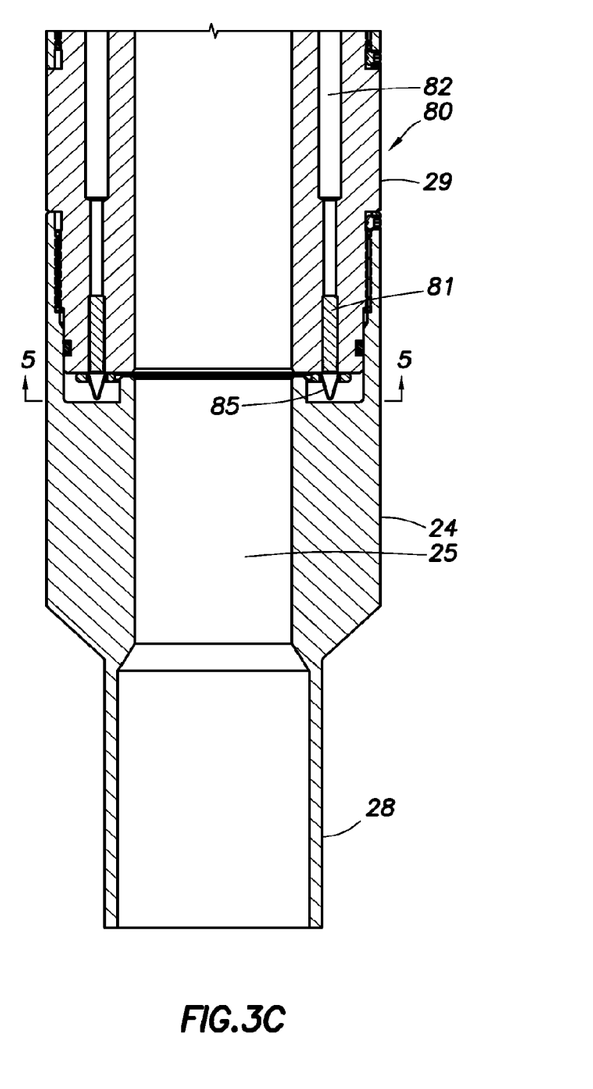

FIGS. 2A-C and 3A-C are cross-sectional views of an exemplary embodiment of the invention. The device 22 has two valve assemblies, a primary valve assembly 30 and a pump-through valve assembly 80. FIGS. 2A-C show the device with the primary valve assembly 30 in an open position. FIGS. 3A-C show the device with the primary valve assembly 30 in a closed position and the pump-through valve assembly 50 in an open position (in the detail).

A downhole standing valve assembly or pump-through fluid loss control device 22 is shown having a substantially cylindrical tool housing 24 comprised of upper and lower subassemblies 26 and 28, for connecting the tool with other sections of a tool string as is known in the art, a primary valve housing member 27 and a pump-through valve housing member 29. The housing members 26-29 are connected to one another, such as by cooperating threads, snap rings, or other mechanisms known in the art. The device defines a flow passageway 25 therethrough, for example, for allowing production fluid to flow toward the surface. The device is preferably made from material capable of withstanding a high-temperature, high-pressure, and/or corrosive environment. For example, in a preferred embodiment, the metal portions of the device are made of 13 chrome stainless steel, or similar (unless specifically called out as another material). This is especially the case where the device is to left in the well for extended periods of time and expected to repetitively function (open and close) a significant number of times.

Within the housing 24 are positioned two valve assemblies, a primary valve assembly 30 and a pump-through valve assembly 80. The device is intended to be used with the upper subassembly uphole from the lower subassembly in its primary configuration. The primary valve assembly 30 includes a valve element assembly 32 and a valve seat assembly 60.

The valve element assembly 32, in a preferred embodiment, has a valve element 34 attached to a sleeve member 36, as shown. The attachment 35 is shown as a threaded screw and ball bearing locking assembly, seen in FIG. 3B. Other attachment methods may be used as are known in the art. The valve element and sleeve member define a fluid passageway 37 therethrough to allow fluid flow through the valve element assembly when in the open position. In a preferred embodiment, the valve element assembly 32 is a poppet valve assembly having a substantially cylindrical wall 59 and a lower end wall 69 which encloses the lower end of the element, as shown. The valve element 36 has one or more ports 31 to allow passage of fluid between the interior and exterior of the valve element assembly 32.

The valve element 34 has a downward facing pressure surface 38. The relatively large surface area of the pressure surface 38 is provided so that the poppet element 34 can be moved upward off its seat with a relatively lower differential pressure. In a preferred embodiment, the valve element 34 defines an arcuate surface 39 which seats on the cooperating valve seat discussed elsewhere herein.

The valve element assembly 32 abuts a bearing 40 and is preferably attached thereto, such as with split ring 41. The bearing is slidably mounted within the housing 24, as shown. The bearing is preferably made of a softer material than the device housing 24, such as an aluminum ASM CU128, or the like, such that the bearing slides easily along the interior wall of the housing 24. The bearing preferably has feet or annular protrusions 47 which provide a limited surface area of contact between the bearing and the interior surface of the housing. An annular space 48 may be defined between the bearing and the housing. A wiper seal 49 is preferably provided between the bearing and the valve assembly, as shown, to prevent well fluids or debris from entering the bearing and biasing spring assembly. In a preferred embodiment, the wiper seal 49 is a spring-energized lip seal made of PTFE.

The bearing 40 is biased towards the closed position by a biasing member, shown as biasing spring 42. The biasing spring 42 is positioned between the bearing 40 and a stationary spring shoulder 43. The spring shoulder can be a profile defined by a portion of the housing 24 as shown. The biasing spring 42 provides a biasing force to maintain the valve element assembly 32 in a closed position, as seen in FIG. 3B, unless and until a fluid provides the necessary differential pressure from below on the downward facing pressure surface 38. The valve element assembly 32 is also acted on by the hydrostatic head above the assembly. The hydrostatic head pressures downward on the upward facing surfaces of the valve assembly 32 and tends to hold the valve assembly in a closed position. The valve must hold against such hydrostatic pressure, which may be substantial, especially in deep water wells.

The biasing spring is designed and selected to compress at a known pressure, thereby providing a mechanism for opening the primary valve at a pre-selected pressure differential across the valve assembly. In a preferred embodiment, the spring holds against differential pressures of less than 15 psi from below the poppet on the pressure surface. Stated another way, the valve assembly opens, as shown in FIG. 3B, when the pressure differential across the valve is 15 psi or greater. Pressure is balanced in the spring volume 50 by fluid from the housing interior through, for example, tortuous path 52, which allows for fluid to enter the volume but excludes debris.

Movement of the valve assembly is limited by cooperating surfaces or shoulders. Downward movement of the valve assembly is limited, in the preferred embodiment, by movement of arcuate surface 39 and valve seat assembly 60. The shoulder 44 is a thicker surface for enhanced wear resistance. Upward movement of the valve assembly 32 is limited by the upper surface 45 of the sleeve 36 abutting the shoulder 46 which further inhibits debris from entering chamber 50.

The valve seat assembly 60 is positioned in the device below the primary valve assembly 30. The valve seat assembly 60 includes a valve seat 61 which is defined by an insert 62 attached to the housing 29. The valve seat 61 is preferably a conical surface which mates with the arcuate surface of the valve element. Other seat designs may be used as are known in the art. The valve seat insert 62 attaches to the housing by threaded connectors 63 extending through collar 67, as shown, or by other mechanisms known in the art. The insert is not strictly necessary as the seat can be formed on the housing, etc. The collar 65 defines a plurality of passageways 64 therethrough which provide fluid communication from the interior passageway of the device (above the primary valve assembly) to the pump-through valve assembly and thence, when the pump-through valve is open, to the interior passageway of the device at the lower end. The passageway through the collar is not strictly necessary either, as the passageway can be provided elsewhere, such as through the housing wall, through the insert wall, etc.

Figure 4:
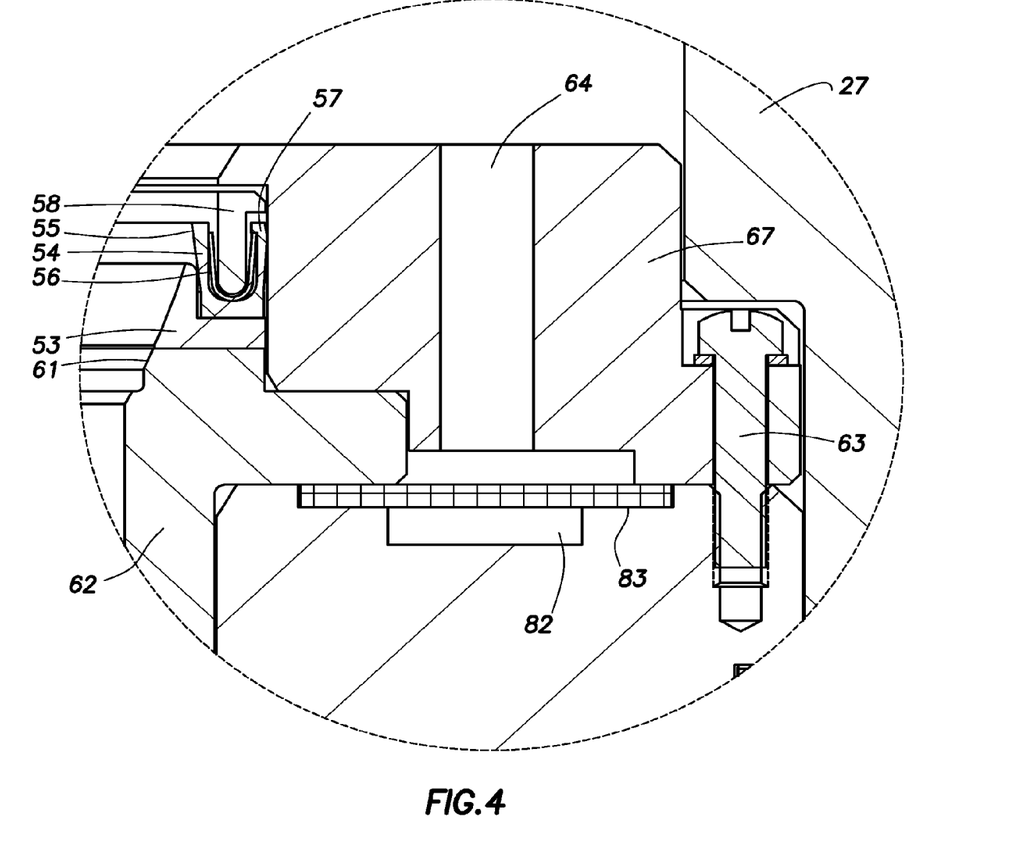
FIG. 4 is a cross-sectional detail of an alternate embodiment of the indicated portion of FIG. 2B.

In a preferred embodiment, an impact cushion 53 is provided, as best seen in FIG. 4, which is the detail indicated in FIG. 2B, but with an alternative embodiment shown, including a cushion insert and wiper seal. To protect the primary valve elements and to prevent early leakage through the primary valve, an impact cushion 53 is provided to cushion the impact of the metal-on-metal seal. Additionally, a secondary seal for sand 54 and a wiping surface 55 is provided. The impact cushion 53 is preferably made of plastic, such as PEEK, PTFE, etc. The impact cushion also acts as a back-up ring for a spring-energized lip seal 54. The seal 54 further seals against fluid passing through the primary valve. The spring 56 energizes the seal element 57 and is trapped in position by stay member 58. In a preferred embodiment, a wiping surface 55 is provided to wipe sand from the surface of the valve element as it moves to the closed position. The lip seal 54 has a surface 55 for this purpose.

The pump-through valve assembly 80 is positioned in the device below the primary valve assembly 30, preferably. Alternate positioning will be apparent to those of skill in the art. The pump-through valve assembly 80 is shown, in a preferable embodiment, defined by and positioned in the wall of the housing 24. Alternate embodiments will be apparent to those of skill in the art.

The pump-through valve assembly, one-way valve assembly, or pressure relief valve assembly, can be of any type known in the art, although the preferred embodiment is shown. The pump-through valve can be a check-valve, a ball check valve, a poppet valve, a swing check valve, etc.

The pump-through valve assembly 80 includes a pressure relief valve 81, a fluid passageway 82, and filters 83-85. Passageway 82 permits fluid communication from the interior passageway 25 of the device above the pump-through valve assembly 80 to the interior passageway of the device below the assembly. In the preferred embodiment, fluid flowing through the pump-down valve assembly passes through passageway 25 of the tool, passageway 37 of the sleeve 36 and valve element 34, the ports 31, and into annular space 86 adjacent the pump-through valve assembly. Alternate arrangements will be recognized by those of skill in art. For example, a fluid passageway can bypass the primary valve assembly altogether, communicating fluid from above the primary valve to the pump-through valve assembly directly.

The pump-through valve assembly 80 preferably has filters 83 and 84 at the upper end of the passageway 82. In a preferred embodiment, the filter 83 is a multi-layered, sintered wire mesh screen. Filter 84, in a preferred embodiment, is a double filter unit safety screen, as shown. A filter 85 is also preferably provided at the lower end of the passageway, shown as a double filter unit safety screen. This filter is secured with ring 66 and screws with lock washers 65 in a preferred embodiment. Such filters are available commercially, for example, from Lee Products.

Figure 6:
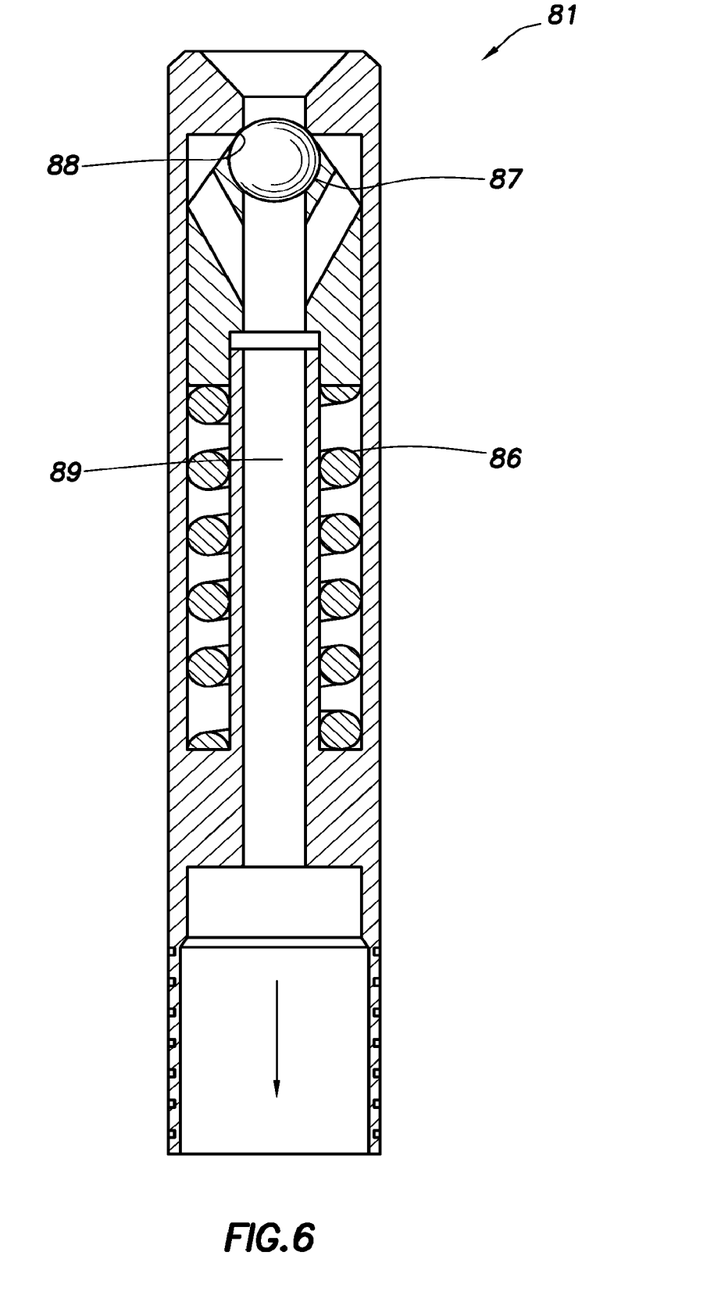
FIG. 6 is a detail cross-section of a pressure relief valve assembly of an exemplary embodiment of the invention.

FIG. 6 is a cross-sectional detailed view of a preferred embodiment of a pressure relief valve assembly 81 insert. The check valve 81 is shown schematically in FIGS. 2-3. The pressure relief valve can take various forms, as is known in the art, and can be an insert, as shown, or assembled piece-meal in the tool. A preferable embodiment is shown at FIG. 6 and is commercially available from, for example, the Lee Company.

The pressure relief valve 81 includes a biasing spring 86, a valve element 87, a valve seat 88, and a fluid passageway 89. The check valve 81 is designed to open with a pressure differential from above while the primary valve remains closed. For example, with the primary valve closed, the pressure relief or check valve opens at a 4000 psi differential pressure. In a preferred embodiment for an 8,000 foot setting depth, the pressure relief valve has a cracking pressure of about 4000 psi differential and a flow rate of about 4 gallons per minute at the optimal pressure differential. The pressure relief valve is seen closed in FIG. 6. When sufficient pressure differential is supplied from above, the valve element 87 unseats from seat 88, compressing spring 86, and fluid flows through passageway 89 and exits the valve assembly.

Figure 5:
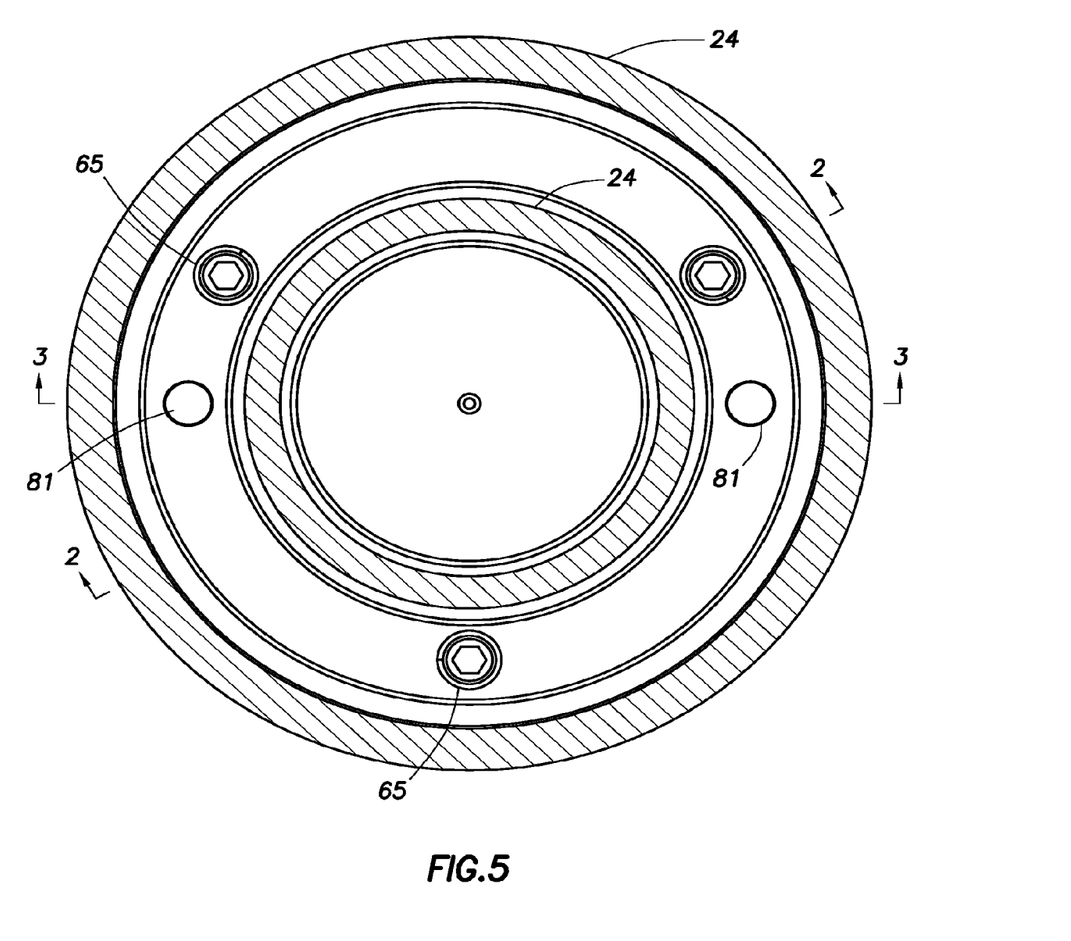
FIG. 5 is a cross-sectional view of an embodiment of the invention taken at line 5-5 indicated on FIG. 3.

The pump-through valve assembly 80 preferably includes multiple pump-through valves spaced around the annular housing wall, as seen in FIG. 5, to provide redundancy and to provide a minimum desired flow rate when opening pressure differential is applied from above. Threaded connectors 65 can also be seen in FIG. 5.

The purpose of the relief valves is to fill the ESP cavity 11, that is, the tubular space above the ESP and below the fluid loss control device 22, with fluid for pump start up so the ESP will not have to start dry. However, when filling this cavity, which may be considerable given that various equipment and tools can be located between the ESP and fluid loss control device, the downward flow rate must be relatively low so that the pump is not caused to spin backwards. The cavity may be lengthened by the placement of tools, such as flow meters, environmental parameter sensors, lower chemical injectors, screens and the like. For the sake of discussion, the ESP has a critical reverse flow rate at which the pump will be caused to spin backwards or will suffer damage due to backwards spinning. A flow rate into the outlet of the pump below the critical rate will not cause the pump to spin backwards or will not damage the pump. The relief valves 81 are selected to fill the ESP cavity without exceeding the critical reverse flow rate. The number, size, maximum and optimal flow rates, cracking pressure, etc., of the pressure relief valve assemblies can be selected to provide fluid flow below the fluid loss control device below the critical flow rate of the pump. In a preferred embodiment, for example, two pressure relief valves provide for four gallons of flow per minute, providing a total of eight gallons of flow per minute to the ESP cavity and into the ESP.

The phrase "spin the pump backwards" and similar is used herein to indicate rotation of a pump element, such as the impeller, in the reverse direction to its normal direction of rotation. It is understood that the pump unit itself does not spin but rather an element within the pump.

In use, the pump-through fluid loss control device is placed into position at a downhole location within a wellbore. For example, the device can be placed in a well as part of a completion string. In the exemplary embodiment shown, the device is placed below a packer or similar device which isolates the lower wellbore. A pump, such as an ESP, is positioned below the device. When placed in the well, the primary valve assembly provides a metal-to-metal seal to hold against hydrostatic head. The primary valve is also biased closed by a biasing spring or similar. The primary valve opens when differential pressure across the valve, pressured from below, exceeds a selected pressure. The pump is in fluid communication with the wellbore fluid in the wellbore below the packer. When turned on, the pump suctions in fluid and pumps it up the string and into the interior space of the device. Pressure will build on the pressure surface of the primary valve element. The valve element and sleeve will displace upward in response to the minimum necessary pressure differential. Wellbore fluid then flows through the open primary valve, through the element ports, and up the string. When the pump is shut down, the primary valve displaces back to the closed position. The primary valve assembly prevents fluid flow downward, thereby preventing fluid from forcing the pump to rotate in reverse, from contaminating the wellbore below the valve, etc.

Once closed, it is then possible to flow fluid past the device downward, to lubricate the ESP, to fill the string below the device, to inject fluids, etc. The fluid in the string is pressured up such that a relatively higher differential pressure acts, from above, across the pressure relief valve assembly. The pressure relief valves (or pump-through valves) are opened by tubing pressure above the valves. The pressurized fluid forces the valve open (unseats the valve element) and fluid flows through the device passageway, into the annular space adjacent the pump-through valve, through filters if installed, through the pump-through valve passageway and provides pressure to the pump-through valve element. At a selected minimum crack pressure, the pump-through valve opens, providing fluid flow into the device passageway below the valve and thence to the lower well string and pump. When tubing pressure from above is reduced, the pump-through valve is biased shut and flow ceases. The pump, now primed and lubricated, can now be turned back on.

The invention has been described primarily in relation to use above a submersible pump. Alternate uses will be apparent to those of skill in the art where pump-through fluid loss control devices will be of service.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

It is claimed:

1. A method of controlling flow in a subterranean well extending through a hydrocarbon bearing formation, the method comprising the steps of:
    disposing a downhole submersible pump in said well, said pump defining a critical reverse flow rate;
    selecting a one-way primary valve characterized by a low resistance to flow and a low opening differential pressure;
    disposing said primary valve within a standing valve assembly so as to allow uphole flow;
    selecting a one-way pump-through valve characterized by a high resistance to flow and a high opening differential pressure so that a flow rate through said pump-through valve at said high opening differential pressure is less than said critical reverse flow rate;
    disposing said pump-through valve within said standing valve assembly so as to allow downhole flow;
    disposing said standing valve assembly in said well uphole of said submersible pump;
    opening the primary valve in response to a differential pressure acting upward across the primary valve greater than said low opening differential pressure;
    pumping fluid by said submersible pump through the primary valve;
    closing the primary valve in response to a differential pressure acting upward across the primary valve less than said low opening differential pressure;
    opening the pump-through valve in response to a differential pressure acting downward across the pump-through valve greater than said high opening differential pressure; and
    flowing fluid downward through the pump-through valve while the first one-way valve is closed.

2. A method as in claim 1, wherein the primary valve is a poppet valve.

3. A method as in claim 1, wherein the primary valve includes a movable first valve element having a substantially cylindrical wall defining a fluid passageway therethrough, and having an enclosed lower end with a downward facing surface.

4. A method as in claim 3, wherein the first valve element further includes at least one port through a substantially cylindrical wall thereof.

5. A method as in claim 1, further comprising:
    flowing fluid through a passageway in a movable valve element of the primary valve, and then through the pump-through valve.

6. A method as in claim 5, further comprising the step of flowing fluid through at least one port defined in a side wall of the movable valve element.

7. A method as in claim 1, wherein the primary valve is biased closed.

8. A method as in claim 7, wherein the primary valve is biased closed by a spring to a differential pressure value of less than 15 psi.

9. A method as in claim 1, wherein the pump-through valve is biased closed.

10. A method as in claim 9, wherein the pump-through valve is biased closed by a spring to a differential pressure value greater than or equal to 3600 psi.

11. A method as in claim 1, wherein the pump-through valve is a pressure relief valve.

12. A method as in claim 1, wherein the step of flowing fluid downward further includes flowing fluid through multiple one-way valves spaced around the circumference of the standing valve assembly.

13. A method as in claim 1, further comprising flowing fluid downward through the standing valve assembly to the submersible pump at a flow rate that is low enough to not spin the pump backwards.

14. A method as in claim 13, wherein the flow rate is restricted, at least in part, by a size characteristic of said pump-through valve.

15. A method as in claim 12, further comprising the step of substantially filling the well between the submersible pump and the standing valve assembly.

16. A method as in claim 12, further comprising the step of lubricating the pump.

17. A method as in claim 1, further comprising the step of injecting fluid into the well below the standing valve assembly.

18. A method of using a downhole device having a first and a second one-way valve therein in a subterranean well extending through a hydrocarbon bearing formation, the method comprising:

opening the first one-way valve in response to a first, selected differential pressure acting upward across the first one-way valve;

flowing fluid upward through the device through the first one-way valve while the second one-way valve is closed;

closing the first one-way valve by reducing the first differential pressure across the first one-way valve;

opening the second one-way valve in response to a second, selected differential pressure acting downward across the second one-way valve; and flowing fluid downward through the second one-way valve while the first one-way valve is closed wherein the step of flowing fluid downward further includes flowing fluid through multiple one-way valves spaced around the circumference of the device.

19. A method of controlling flow in a subterranean well extending through a hydrocarbon bearing formation, the method comprising:

disposing a downhole submersible pump in said well;

disposing a one-way primary valve within a standing valve assembly so as to allow uphole flow;

disposing a plurality of one-way pump-through valves spaced about a circumference of the standing valve assembly so as to allow downhole flow;

disposing said standing valve assembly in said well uphole of said submersible pump;

opening the primary valve in response to a differential pressure acting upward across the primary valve greater than a primary valve opening differential pressure;

pumping fluid by said submersible pump through the primary valve;

closing the primary valve in response to a differential pressure acting upward standing valve assembly less than the primary valve opening differential pressure; and opening at least one of the plurality of pump-through valves in response to a differential pressure acting downward across the standing valve assembly greater than a pump through opening differential pressure.

\* \* \* \* \*